Figure 1:
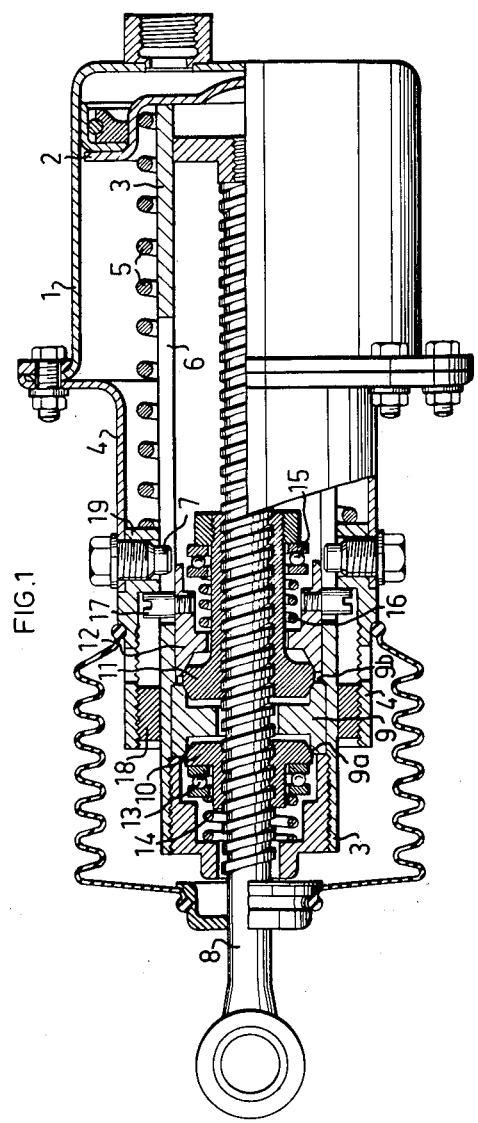

July 10, 1962  K. B. LARSSON  3,043,406
AIR BRAKE CYLINDERS WITH BUILT-IN SLACK ADJUSTER
Filed Jan. 23, 1961  2 Sheets-Sheet 1

INVENTOR
KARL BERTIL LARSSON
BY
ATTORNEYS

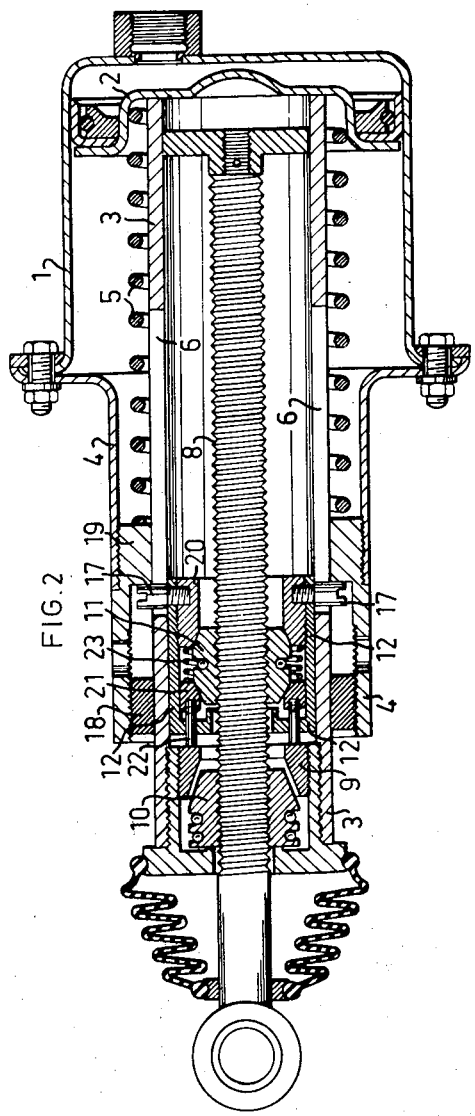

United States Patent Office 3,043,406
Patented July 10, 1962

3,043,406
AIR BRAKE CYLINDERS WITH BUILT-IN
SLACK ADJUSTER
Karl Bertil Larsson, Malmo, Sweden, assignor to Svenska Aktiebolaget Bromsregulator, Malmo, Sweden, a corporation of Sweden
Filed Jan. 23, 1961, Ser. No. 84,097
Claims priority, application Germany Jan. 27, 1960
9 Claims. (Cl. 188—196)

This invention relates to air brake cylinders with built-in slack adjuster devised for automatically taking up the excess of slack in the brake rigging on release of the brake after a braking operation at which the travel of the brake cylinder piston exceeded the normal distance.

In air brake cylinders with a projecting push rod for transmitting the braking power of the brake cylinder onto the brake rigging various structures of built-in slack adjuster heretofore have been devised, in which the brake cylinder piston has a tubular piston rod guided in the front head of the brake cylinder, and the projecting push rod is disposed in telescoping relation to the tubular brake piston rod and in engaging and axially displaceable relation to two ratchets. The first ratchet is axially movable together with the tubular brake piston rod in relation to the brake cylinder and is devised to carry the push rod along in any movement of the brake piston in the direction toward the cylinder front head, that is in the direction for applying the brake. The second ratchet is axially movable in relation to the brake cylinder only within the normal distance of the brake piston travel and permits a relative axial dispacement of the same and the push rod in the slack reducing direction on braking if and when the brake piston travel exceeds the normal distance, and then a corresponding axial displacement of the push rod also in relation to the first ratchet takes place at the following release of the brake.

Air brake cylinders with built-in slack adjusters of the type briefly described above are most used on locomotives and engine cars (motor-cars) in which the brake rigging often has to transmit very high braking forces and therefore is so heavy-built and heavy to move that with the structures of air brake cylinder with built-in slack adjusters theretofore proposed the usual return spring disposed between the brake piston in the brake cylinder and the front head thereof is insufficient for safely ensuring correct operation of the built-in slack adjuster and therefore has to be supplemented by further return spring means disposed in the brake rigging outside the brake cylnider. In locomotivees and engine cars (motor-cars) the brake equipment is often subjected to strong vibrations, and with an air brake cylinder with built-in slack adjusters of any of the various structures heretofore devised it has proved difficult to provide for a safe locking of the slack adjuster in a simple manner against incorrect slack adjusting movements under the influence of vibrations and under the influence of manipulations of a hand brake connected in a simple manner to the power brake rigging at its point of connection with the projecting push rod of the brake cylinder.

The invention has for its object to provide an air brake cylinder with a built-in slack adjuster of the type stated above and of a structure eliminating the drawbacks of the various structures heretofore devised. For this object and such further objects as will be apparent to those skilled in the art from the detailed description below of forms of the invention illustrated on the accompanying drawings, the structure contemplated by the invention is characterized primarily by the second ratchet and the push rod of the brake cylinder being so related to one another and to the tubular brake piston rod that the tubular brake piston rod, when moving within the normal distance of the brake piston travel during the return of the brake piston under the action of the return spring in the brake cylinder at the release of the brake after a braking operation, carries the second ratchet and by the intermediary of the latter also the push rod along in this return movement of the brake piston. This implies that the two ratchets at released brake lock the push rod, each in one of the two opposite directions, against axial displacement in relation to the tubular brake piston rod, so that, independently of the power of any return spring means disposed in the brake rigging outside the brake cylinder, an incorrect slack adjusting movement between the push rod and the tubular brake piston rod cannot result from the action of vibrations or from pull being exerted on the push rod by the hand brake or otherwise.

For the control of the second ratchet there may be provided, as is known, a separate control member that is axially movable in relation to the tubular brake piston rod only with the normal distance of the brake piston travel. In accordance with the invention the control of the second ratchet by means of such a control member preferably is so devised that the second ratchet at fully released brake by the intermediary of the control member transmits the force of the return spring in the brake cylinder from an abutment of the tubular brake piston rod onto an abutment of the brake cylinder and under the action of this force is locked in both directions on the push rod. This gives increased safety against unintentional axial displacements of the push rod in relation to the tubular brake piston rod both during release of the brake and at fully released brake.

Though the invention is not concerned with the construction of the ratchets proper or the construction of the push rod for its location with the ratchets, in that the invention principally permits the use of ratchets of any of the various types heretofore devised for use in automatic brake slack adjusters, in the preferred form of the invention the push rod is constructed as a screw spindle and the ratchets as nuts screwed onto the screw spindle, the lead of the threads of the screw spindle and the nuts being such as to make them non-selflocking. In this form of the invention the tubular brake piston rod must be non-rotatable, for which purpose it preferably is provided with longitudinally extending slots for studs secured to the brake cylinder. In accordance with the invention it is further preferred to prevent rotation of the axially movable control member in the tubular brake piston rod by providing said member with studs engaged in the longitudinally extending slots in the tubular brake piston rod and disposed so that the control member by means of these studs coacts with abutments provided in the front head of the brake cylinder for limiting the axial movement of the control member in relation to the brake cylinder, the outer of these abutments preferably being made axially adjustable in the front head of the brake cylinder.

In the accompanying drawings:
FIG. 1 illustrates the preferred form of the invention in axial section through the brake cylinder, and
FIG. 2 illustrates in the same manner a second form of the invention.

In the drawings, 1 denotes the body of the brake cylinder and 2 the brake piston having secured thereto a tubular piston rod 3 guided in the front head 4 of the brake cylinder. At fully released brake the brake piston 2 is held in the position shown by the usual return spring 5 which is disposed around the tubular brake piston rod 3 and clamped between the piston 2 and the cylinder front head 4 which is attached to the cylinder body 1. The tubular piston rod 3 is provided with longitudinally extending slots 6 and is held against rotation by means of studs 7 (FIG. 1) secured to the cylinder front head 4 and engaging in the slots 6. The projecting brake cylinder push rod 8, to the outer end of which the brake rigging is to be connected, is disposed in telescoping relation to the tubular brake piston rod 3. In the form shown in FIG. 1 the push rod 8 is constructed as a screw spindle and carries two ratchets 10 and 11 which are disposed each on one side of an abutment ring 9 secured in the tubular piston rod 3 and which consist of nuts screwed onto the screw-spindle, the lead of the coacting threads of the screw spindle and the two nuts 10 and 11 thereon being sufficiently high to make them non-selflocking. Axially clamped between the first nut 10 and the tubular piston rod 3 are an antifriction thrust bearing 13 and a spring 14 which in the shown position at released brake holds the nut 10 non-rotatably engaged with the abutment ring 9 which in fully released position of the brake axially supports the tubular piston rod 3 against the cylinder front head 4 by the intermediary of the second nut 11 and a control member 12 therefor. The control member 12 is constructed as a sleeve axially slidable in the tubular piston rod 3 and axially displaceable in relation to the brake cylinder only within the normal distance of the travel of the brake piston on application and release of the brake. The nut 11 is rotatably and axially displaceably connected with the sleeve 12 by means of an antifriction thrust bearing 15 and a spring 16 axially clamped between the nut and the sleeve. The sleeve 12 is held against rotation by studs 17 thereon engaging in and extending radially through the longitudinal slots 6 in the tubular piston rod 3 and coacting with abutments 18 and 19 in the cylinder front head 4 for limiting the axial movement of the sleeve 12 in relation to the cylinder to the normal distance of the travel of the brake piston 2. The outer abutment 18 is axially adjustable in the front cylinder head 4 for the purpose of altering the normal distance of the brake piston travel, which the slack adjuster has for its object to keep constant.

The operation of the form of the invention described above with reference to FIG. 1 is as follows.

FIG. 1 shows the brake piston 2 and the tubular piston rod 3, which is secured to the brake piston, in their rear end position in the brake cylinder at released brake, into which position they are returned by the strong return spring 5 in the brake cylinder at the release of the brake after braking. In this position of the brake piston the return spring force on the piston is not transmitted by the piston onto the rear end wall of the brake cylinder. On the contrary, there is a clearance between the brake piston and the rear end wall of the brake cylinder, in that the return movement of the brake piston on release of the brake after braking is limited and the return spring force on the brake piston in the rear end position thereof is transmitted onto the cylinder front head 4 by means of the tubular piston rod 3, the abutment ring 9 therein, the nut 11, the sleeve 12 and its studs 17 engaging the abutment 19 on the cylinder front head 4. This implies that the nut 11 is subjected to thrust and firmly clamped between the conical abutment and friction surface 9b on the rear side of the abutment ring 9 and the sleeve 12 by the force of the strong return spring 5 and thereby safely locked against rotation and displacement in either direction on the push rod 8 when the brake piston 2 is in its rear end position in the brake cylinder.

The utilization of the force of the strong return spring 5 in the brake cylinder to ensure a safe locking of the rider 11 against displacement on the push rod 8 when the brake piston is in its rear end position in the brake cylinder, is a principal and important feature of the invention, and this feature is applicable not only where the push rod 8 and the riders 10 and 11 are of the construction shown in FIG. 1 but for example also where the push rod 8 is constructed as a toothed ratchet bar and the riders 10, 11 are constructed as pawls or other ratchets coacting with the ratchet bar.

When at braking compressed air is admitted into the brake cylinder behind the brake piston 2 and moves the piston and thereby the piston rod 3 forwardly, that is to the left in FIG. 1, the push rod 8 is carried along in this brake applying movement by the abutment ring 9 and the nut 10, the conical abutment and friction surface 9a on the front side of the abutment ring 9 in that the thrust exerted on the nut 10 by the abutment ring 9 produces a safely sufficient friction between the conical abutment and friction surface 9a on the front side of the abutment ring 9 and the nut 10 for locking it against rotation and displacement on the push rod 8. The spring 16 holds the control member 12 frictionally engaged with the nut 11 and thereby prevents rotation and displacement of the nut 11 on the push rod 8 and carries the control member 12 along in the forward movement of the push rod 8 as long as this movement does not exceed a normal brake applying stroke. If and when the forward movement of the push rod 8 exceeds a normal brake applying stroke, the forward movement of the control member 12 is stopped by the studs 17 engaging the outer abutment 18 on the cylinder front head 4. At the continued forward movement of the push rod 8 after the forward movement of the control member 12 has been stopped, the spring 16 opposes further forward movement of the nut 11 together with the push rod 8 and yields sufficiently to permit the nut 11 to lose its locking frictional engagement with the control member 12 and to rotate and thereby displace itself axially in the brake slack reducing direction (that is to the right in FIG. 1) on the push rod 8 under the action of the thrust of the threads of the push rod 8 on the threads of the nut 11. As soon as the continued forward movement of the push rod 8 ceases, the nut 11 is again frictionally engaged with the control member 12 by the spring 16 and thereby locked against rotation, and the axial distance meanwhile obtained between the nut 11 and the abutment ring 9 is equal to the distance by which the forward movement of the push rod 8 exceeded a normal brake applying stroke.

The brake slack adjusting movement of the push rod 8 in relation to the tubular brake piston rod 3 takes place during the return movement of the brake piston 2 into its rear end position in the brake cylinder at the release of the brake after the braking operation at which the brake applying stroke exceeds its normal value. This return movement is brought about by the strong return spring 5 in the brake cylinder, and the slack adjusting movement runs its course in somewhat different ways according as a strong return spring force is provided for or not in the brake rigging operated by the push rod 8 of the brake cylinder.

Where little or no return spring force is provided for in the brake rigging and the latter is heavy to move and offers a resistance to return movement of the brake piston 2 in the brake cylinder, the rush rod 8 will be subjected to pull in the brake release direction during the whole brake release movement. As there is an axial play between the nut 11 and the abutment ring 9, the nut 10 may initially be retained by said pull which may cause the spring 14 to yield. If and when the spring 14 yields to said pull, the nut 10 loses its frictional engagement with the friction surface 9a on the abutment ring 9, and under the action of the thrust from the spring 14 the nut 10 rotates and displaces itself axially on the non-selflocking threads of the push rod 8 in the slack reducing direction (that is to the right in FIG. 1). Provided that the pull in the push rod 8 overcomes the spring 14, this movement of the nut 10 in relation to the push rod 8 is not stopped until the nut 11 by partaking in the movement of the push rod 8 has consumed the above-mentioned distance from the abutment ring 9 and engages the conical abutment and friction surface 9b on the rear side of the abutment ring 9. When this occurs the brake slack adjusting movement has come to its end, and at the continued brake release movement the brake piston 2 and the tubular piston rod 3 and all parts therein, including the push rod 8, move in unison until the movement is stopped by the studs 17 engaging the inner abutment 19 on the cylinder front head 4.

Where a very strong return spring force is provided for in the brake gear, the push rod 8 will be subjected to thrust in the brake release direction during the whole brake release movement. During the first part of the brake release movement the nut 10 remains locked against rotation because it transmits the thrust from the push rod 8 onto the abutment ring 9 and is frictionally engaged therewith by said thrust, and the brake piston 2 and the tubular piston rod 3 and all parts therein, including the push rod 8, move in unison in the brake release direction until the studs 17 engage the abutment 19 on the cylinder front head 4. This first part of the brake release movement corresponds to a normal brake applying stroke and has carried the push rod 8, the nut 11 and the control member 12 into their positions at released brake, while the return spring 5 urging the piston 2 and the piston rod 3 in the brake release direction still can move the piston 2 and piston rod 3 further in this direction because the above-mentioned distance between the nut 11 and the abutment ring 9 still remains to be consumed. The thrust in the push rod 8 is now transmitted onto the abutment 19 via the nut 11 and the control member 12, whereby the nut 10 is released from being clamped between the threads of the push rod 8 and the abutment ring 9. The great force of the return spring 5 acting on the nut 10 via the antifriction thrust bearing 13 will easily compress the spring 14 and thus relieve the nut 10 from being locked to the abutment ring 9. During this continued movement of the brake piston 2 and piston rod 3 in the brake release direction the nut 10 is brought to rotate and to displace itself axially on the already arrested push rod 8 until the abutment ring 9 engages the already arrested nut 11. Now all parts have returned to their end positions at released brake and the brake slack adjusting movement has come to its end and the push rod 8 and the piston rod 3 are safely interlocked against relative displacement under the action of shocks and vibrations and pull on the push rod 8 from say a hand brake connected to the push rod or to the brake rigging operated by the push rod.

In practice the slack adjusting movement of the push rod 8 in relation to the piston rod 3 may run its course in various ways intermediate the two above described, depending upon how heavy the brake rigging operated by the push rod 8 is to move, upon the return spring force provided for in the brake gear, and upon shocks and vibrations during the brake release movement.

The form of the invention shown in FIG. 2 differs from the above described form of FIG. 1 substantially only in that the push rod 8 is constructed as a screw spindle adapted to operate as a ratch bar by the ratchet nuts 10 and 11 thereon being divided into sectors resiliently held together by spring means, so that the nuts, when being axially displaced on the screw spindle, ratch over the threads of the screw spindle and do not rotate thereon, and so that blocking of the nuts in their positions on the screw-spindle is effected by the coaction of the nuts with abutments preventing the nut sectors from moving radially out of their engagement with the threads of the screw spindle. The second nut 11 coacts with two such abutments of which one abutment 20 is secured in the sleeve 12 and the other abutment 21 is axially displaceable in the sleeve 12 and provided with axially projecting studs 22 for coaction with the abutment ring 9, a spring 23 being clamped between the two abutments 20 and 21.

What I claim and desire to secure by Letters Patent is:

1. An air brake cylinder with a built-in automatic brake slack adjuster, comprising, in combination, a cylinder body, a cylinder front head attached to the front end of said cylinder body, a brake piston slidable in said cylinder body, spring means disposed in the brake cylinder between said cylinder front head and said brake piston for returning to the brake piston to its rear end position in the brake cylinder after braking, a tubular piston rod secured to said brake piston and guided in said cylinder front head, a projecting push rod disposed in telescoping relation in said tubular piston rod, means comprising a first abutment in said tubular piston rod and a first push rod engaging means axially displaceable on and lockable to said push rod and disposed in front of said first abutment in said tubular piston rod so as to be engaged by said first abutment and thereby locked to said push rod for carrying the latter along in the forward movement of said brake piston and tubular piston rod in the brake cylinder on braking, means comprising a second abutment in said tubular piston rod and a second push rod engaging means axially displaceable within limits in relation to said cylinder body and cylinder front head and disposed to the rear of said second abutment in said tubular piston rod so as to be engaged by said second abutment and thereby locked to said push rod on the return movement of said brake piston and tubular piston rod in the brake cylinder after braking, and a further abutment abuttable against said cylinder front head and engageable by said second abutment, said tubular piston rod, and said second push rod engaging means for limiting the return movement of said brake piston in the brake cylinder after braking and for subjecting said second push rod engaging means to thrust between said second abutment in said tubular piston rod and said further abutment on said cylinder front head by the force of said spring means to safely lock said second push rod engaging means against displacement in either direction on said push rod when said brake piston is in its rear end position in the brake cylinder.

2. An air brake cylinder with a built-in automatic brake slack adjuster as set forth in claim 1, and in which said tubular piston rod has an abutment ring therein having on its front side said first abutment and on its rear side said second abutment.

3. An air brake cylinder with a built-in automatic brake slack adjuster as set forth in claim 1, in which said further abutment means abuttable against said cylinder front head comprises a member which is axially slidable in said tubular piston rod and has a projection thereon axially movable within limits in relation to said cylinder front head, the engagement of the projection against said cylinder front head limiting the return movement of said brake piston in the brake cylinder after braking, said member being disposed between said second push rod engaging means and said cylinder front head for clamping said second push rod engaging means between said second abutment and said member by the force of said spring means to safely lock said second push rod engaging means against axial displacement in either direction on said push rod when said brake piston is in its rear end position in the brake cylinder, and for axially spacing the limits of the axial movement of said second push rod engaging means in relation to said cylinder front head a distance equal to a normal brake applying stroke of said brake piston in the brake cylinder.

4. An air brake cylinder with a built-in automatic brake slack adjuster, comprising, in combination, a cylinder body, a cylinder front head attached to the front end of said cylinder body, a brake piston slidable in said cylinder body, spring means disposed in the brake cylinder between said cylinder front head and said brake piston for returning the brake piston to its rear end position in the brake cylinder after braking, a tubular piston rod secured to said brake piston and guided in said cylinder head, a projecting screw-threaded push rod disposed in telescoping relation in said tubular piston rod, an abutment ring secured in said tubular piston rod, a first screw-threaded nut engaging the threads of and axially displaceable on and lockable to said push rod and housed in said tubular piston rod in front of said abutment ring so as to be engaged by said abutment ring and thereby locked against axial displacement on said push rod for carrying the push rod along in the forward movement of said brake piston and piston rod in the brake cylinder on braking, a second screw-threaded nut engaging the threads of and axially displaceable on and lockable to said push rod and disposed to the rear of said abutment ring in said tubular piston rod so as to be engaged by said abutment ring and thereby locked against axial displacement on said push rod on the return movement of said brake piston and piston rod in the brake cylinder after braking, and a member axially movable in said tubular piston rod and normally engaged by said second nut and axially movable in relation to said cylinder front head within a range corresponding to a normal brake applying stroke of said brake piston in the brake cylinder for limiting the return movement of said brake piston in the brake cylinder after braking and for transmitting onto said cylinder front head through said tubular piston rod and abutment ring the force of said spring means on said brake piston in the rear end position thereof in the brake cylinder and for holding said second nut clamped between said abutment ring and said member by said force and thereby safely locked against displacement in either direction on said push rod when said brake piston is in its rear end position in the brake cylinder.

5. An air brake sylinder with a built-in automatic brake slack adjuster as set forth in claim 4, wherein said tubular piston rod has longitudinal slots therein, said cylinder front head has studs engaging in said slots for preventing rotation of said tubular piston rod, said member has studs projecting through said slots for preventing rotation of said member, and said cylinder front head has further abutments thereon with which said projecting studs on said member coact for limiting the axial movement of said member in both directions in relation to said cylinder front head.

6. An air brake cylinder with a built-in automatic brake slack adjuster as set forth in claim 4, wherein said tubular piston rod and said axially movable member therein are held in non-rotatable relationship to said cylinder front head, and the coacting threads of said push rod and said first and second nuts are of a lead making them non-selflocking.

7. An air brake cylinder with a built-in automatic brake slack adjuster as set forth in claim 6, and means comprising a spring and an antifriction thrust bearing disposed between said second nut and said member for normally holding said second nut engaged with said member and for permitting rotation of said second nut on said push rod under the action of a forwardly directed thrust of the threads of said push rod on the threads of said second nut.

8. An air brake cylinder with a built-in automatic brake slack adjuster, comprising, in combination, a cylinder body, a brake piston slidable in said cylinder body, a cylinder front head attached to the front end of said cylinder body, spring means disposed in the brake cylinder between said cylinder front head and said brake piston for returning the brake piston to its rear end position in the brake cylinder after braking, a tubular piston rod secured to said brake piston and guided in said cylinder front head, a projecting push rod disposed in telescoping relation in said tubular piston rod, a first abutment in said tubular piston rod and a first ratchet axially displaceable on the lockable to said push rod and disposed in front of said first abutment so as to be engaged by said first abutment and thereby locked to said push rod for carrying the push rod along in the forward movement of said brake piston and tubular piston rod in the brake cylinder on braking, a second abutment in said tubular piston rod and a second ratchet axially displaceable on and lockable to said push rod and axially movable within limits in relation to said cylinder front head and disposed to the rear of said second abutment so as to be engaged by said second abutment and thereby locked to said push rod on the return movement of said brake piston in the brake cylinder after braking, and a further abutment on said cylinder front head for limiting the return movement of said brake piston in the brake cylinder and for subjecting said second ratchet through said tubular piston rod and said second abutment to the thrust force of said spring means for locking said second ratchet against displacement in either direction on said push rod when said brake piston is in its rear end position in the brake cylinder.

9. An air brake cylinder with a built-in automatic brake slack adjuster, comprising, in combination, a cylinder body, a cylinder front head attached to the front end of said cylinder body, a brake piston slidable in said cylinder body, spring means disposed in the brake cylinder between said cylinder front head and said brake piston for returning the brake piston to its rear end position in the brake cylinder after braking, a tubular piston rod secured to said brake piston and guided in said cylinder front head and provided with longitudinal slots, studs on said cylinder front head and engaged in said slots for preventing rotation of said tubular piston rod in said cylinder front head, a screw-threaded projecting push rod disposed in telescoping relation in said tubular piston rod, two nuts threaded on said screw-threaded push rod, the coacting threads of said push rod and said nuts having a lead making them non-selflocking, an abutment ring secured in said tubular piston rod between said two nuts and adapted to engage them for locking them against displacement on said push rod, axially spaced abutments on said cylinder front head, a sleeve axially movable in said tubular piston rod and normally engaged by the rear one of said nuts, studs provided on said sleeve and projecting through said slots in said tubular piston rod for coaction with said axially spaced abutments in said cylinder front head for limiting axial movement of said rear one of said nuts in relation to said cylinder front head to a distance equal to a normal brake applying stroke of said brake piston in the brake cylinder and for limiting the return movement of said brake piston in the brake cylinder and for subjecting said rear one of said nuts to thrust between said abutment ring and said sleeve by the force of said spring means to safely lock said rear one of said nuts against displacement in either direction on said push rod when said brake piston is in its rear end position in said cylinder.

References Cited in the file of this patent
UNITED STATES PATENTS

| | | |
|---|---|---|
| 2,752,012 | Moorhead | June 26, 1956 |

FOREIGN PATENTS

| | | |
|---|---|---|
| 1,102,844 | France | May 5, 1955 |
| 553,112 | Great Britain | May 7, 1943 |